Nov. 20, 1928.

J. REUTHER 1,692,468

POTATO DIGGER

Filed Feb. 26, 1927  2 Sheets-Sheet 1

Inventor,
John Reuther,
by Geyer & Geyer
Attorneys.

Nov. 20, 1928.
J. REUTHER
1,692,468
POTATO DIGGER
Filed Feb. 26, 1927      2 Sheets-Sheet 2
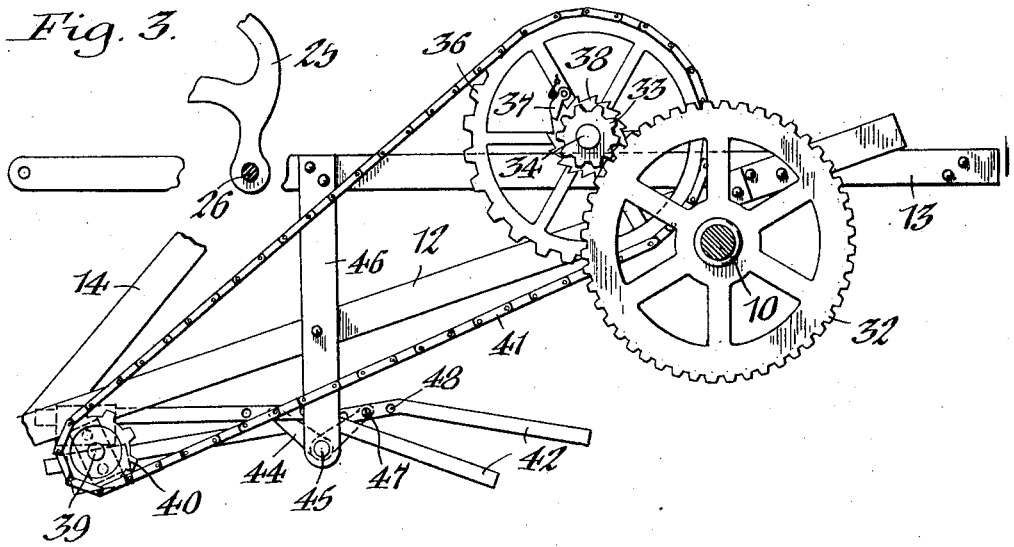
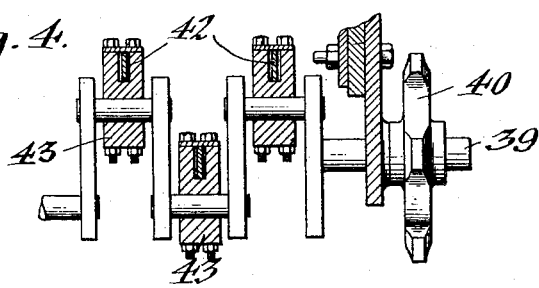
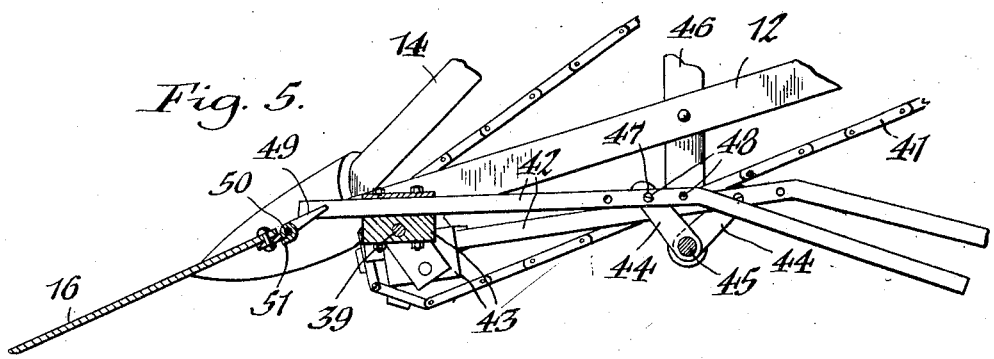
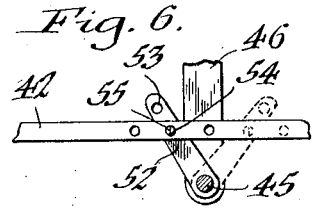
Inventor:
John Reuther,
by Geyer & Geyer
Attorneys Patented Nov. 20, 1928.

1,692,468

UNITED STATES PATENT OFFICE.

JOHN REUTHER, OF EAST AURORA, NEW YORK.

POTATO DIGGER.

Application filed February 26, 1927. Serial No. 171,290.

This invention relates generally to potato diggers of that class having a plow which enters the hills and elevates the soil, potatoes and vines, and a separator which receives the material from the plow and separates the potatoes from the earth and vines.

One of its objects is the provision of a digger of this character which is simple, compact and inexpensive in construction, which is reliable and efficient in operation, and which is comparatively light so that it can be readily drawn by one team of horses.

Another object of the invention is to improve the construction of the separator with a view of rendering it more durable and increasing its separating action.

Figure 1:
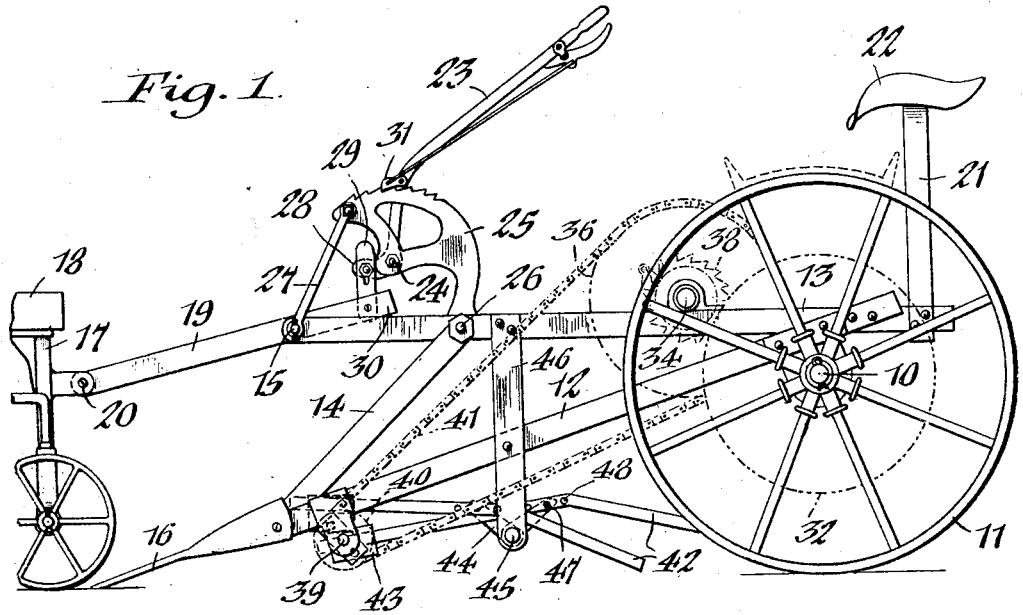
Figure 2:
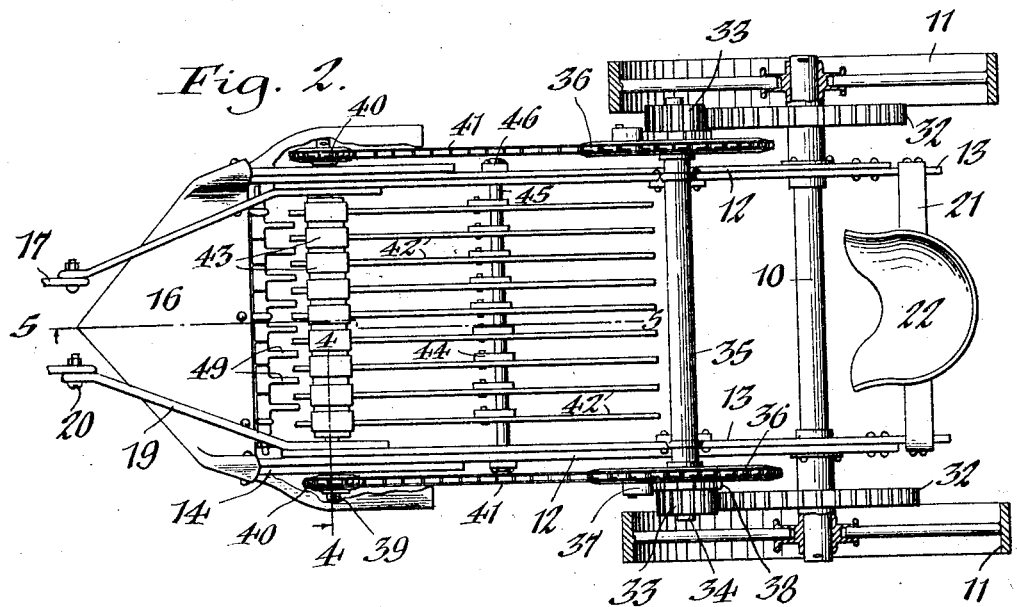

In the accompanying drawings:

Figure 1 is a side elevation of a digger embodying my invention. Figure 2 is a fragmentary top plan view thereof. Figure 3 is an enlarged fragmentary side elevation of the separator and associated parts. Figure 4 is an enlarged fragmentary transverse section on line 4—4, Fig. 3. Figure 5 is an enlarged longitudinal section on line 5—5, Fig. 2. Figure 6 is a detail of a modification of the separator mounting.

Similar characters of reference indicate corresponding parts throughout the several views.

At the rear end of the machine is the main axle 10 to which the ground or traction wheels 11 are fixed in the usual manner. The main frame, which is supported on the axle preferably comprises forwardly-inclined side bars 12, horizontal side bars 13 fastened at their rear ends to the corresponding ends of said inclined bars, diagonal brace bars 14 connecting the forward ends of both sets of side bars, and a tie or pivot rod 15 connecting the front ends of said horizontal side bars. The digging device of the machine may be of any well-known construction, that shown in the drawings consisting of a pointed plow 16 suitably fastened to the front ends of the inclined side bars 12.

17 indicates the customary draft truck which supports the front end of the machine and to which the draft pole 18 is attached. The front end of the main frame is connected to this truck by a yoke 19 pivoted at 20 to the truck and at its rear end to the pivot rod 15. At its rear end, the main frame has a supporting yoke 21 to which a seat 22 is fastened.

For the purpose of swinging the main frame vertically about its axle as a fulcrum to bring the plow into and out of contact with the ground, an elevating mechanism is provided which preferably consists of a hand lever 23 pivoted at 24 to a toothed segment 25 fastened at its lower rear end to a cross bar 26 connecting the side bars 13, while its front end is connected by brace rods 27 with the ends of pivot rod 15, as shown in Figs. 1 and 2. The lower end of the hand lever is provided with a crank arm 28 connected by a link 29 with the rear extension 30 of the draft yoke 19. A locking pawl 31 carried by the hand lever and engaging the teeth of the segment 25 serves to hold the frame in its adjusted position. When this lever is pulled rearwardly, the main frame is elevated about its axle as a fulcrum to clear the plow from the ground, while when said lever is pushed forwardly the frame is lowered and the plow is brought to any desired depth into the ground.

The separator mechanism, which is operatively connected to the traction wheels 11, is preferably constructed as follows:—

Secured to the opposite ends of the axle 10 in the space between the traction wheels and the frame bars 12, 13 are gear wheels 32 which constantly mesh with pinions 33 fixed on the ends of a transverse counter shaft 34 disposed forwardly of the axle and extending through a hollow shaft 35 suitably supported on the machine-frame. Sprocket wheels 36 are loosely mounted on the shaft 34 and each carries a clutch dog 37 adapted to be engaged with or disengaged from a ratchet 38 formed on the companion pinion 33. A crank shaft 39 is journaled at the front end of the frame in suitable bearings applied to the lower ends of the side bars 12 and carries comparatively small sprocket wheels 40, 40 around which and the sprockets 36 drive chains 41 pass. These sprockets 40 are of different diameters for the purpose of varying the speed of rotation of the crank shaft 39 which directly controls the separator elements 42. By this arrangement, when a comparatively slow speed is desired to be imparted to the separator, as for digging in dry ground, the drive is from that side of the machine on which the larger sprocket 40 is located and to this end, the companion sprocket wheel 36 is coupled with the respective drive pinions 33 through the medium of its clutch dog 37. For a faster speed, as when digging in wet ground, the drive is taken through the smaller sprocket on the opposite side of the machine in the same manner.

The separator elements 42, which receive the material dug up by the plow and serve to separate the potatoes from the earth and vines, preferably consist of a plurality of oscillatory bars disposed lengthwise of the machine in parallel relation and extending from a point immediately behind the plow to a point forwardly of the axle 10. These separator bars are so suspended from the frame that during the travel of the machine an up and down and back and forth pitching motion is imparted to them. To this end, bearing blocks 43 are carried by the crank shaft 39, these blocks being provided with longitudinal openings for receiving the front ends of the corresponding bars 42, as shown in Figs. 4 and 5. At a point intermediate their ends the latter are pivotally connected to corresponding rock arms 44 fulcrumed on a pivot rod or supporting rod 45 supported at its ends in upright frame bars 46. By mounting the separator bars in this manner, they are alternately raised and lowered and plunged forward and backward the greatest separation of the bars taking place at their front and rear ends. The connections or pivot pins 47 between the rock arms and separator bars are preferably adjustable so as to regulate the stroke of such bars. For this purpose, each of the latter has two or more openings 48 therein for receiving the respective connecting pin of its rock arm. When said pins are engaged with the front openings, the greatest stroke or separating action of the bars is produced while when engaged with the rear openings, a lesser stroke is obtained. The former adjustment is used in wet digging and the latter in dry digging.

Disposed along the rear edge of the plow 16 and facing rearwardly into the spaces between the front ends of the separator bars 42 are a plurality of fingers 49 which are mounted for vertically-swinging movement on a transverse rod 50. These fingers, while free to swing upwardly in response to any lifting action of the earth, stones or the like, are held against swinging below the plane of the plow face, as shown in Fig. 5. This movement may be prevented by stop lugs 51 or in any other appropriate manner. Said fingers normally act to fill the gap between the opposing ends of the plow and the separator-bars, when the latter are in the retracted or rearward part of their stroke.

Briefly stated, the operation of the machine is as follows:—

The potatoes, soil and vines dug up by the plow 16 pass upon the receiving end of the separator bars 42 which act to vigorously shake the earth and break up the lumps sufficiently to allow them to pass between the bars when they are in their separated positions relative to one another. During this action, the bars assume a more or less inclined position and thereby facilitate the rearward displacement of the materials therefrom. When working in dry or wet ground, the speed of the crank shaft 39 can be readily adjusted in the manner heretofore described, and the throw of the elevator bars can likewise be regulated by changing the location of their pivot pins 47 to effect a greater or less separation.

If desired, the throw of the separator bars may be adjusted in the manner shown in Fig. 6, wherein the rock arms 52 have holes 53, 54 located at different distances from their fulcrum. When the pivot pin 55 is connected to the outer hole 53, the throw of the bar is greater, which is desired when working in wet soil. When working in dry soil, the connection is changed to the inner hole to obtain less throw. In this position, the upper ends of the arms 52 project above the separator bars 42 and during their rocking action function to shift the dirt and weeds toward the discharge end of the machine.

I claim as my invention:—

1. In a potato digger, the combination of a frame, a plow, a crank shaft mounted on said frame in rear of the plow, a supporting rod arranged parallel to and rearwardly of said crank shaft, upwardly-facing rock arms mounted on said rod and free to swing vertically thereon and a plurality of separator bars arranged side by side lengthwise of the frame and connected at their front ends to said crank shaft and at a point intermediate their ends to the free upper ends of the respective rock arms.

2. In a potato digger, the combination of a frame, a plow, a crank shaft mounted on said frame in rear of the plow, rock arms disposed transversely of the frame in spaced relation to the crank shaft, and a plurality of separator bars arranged side by side lengthwise of the frame and connected at their front ends to said crank shaft and at a point forwardly of their rear ends to the respective rock arms, the separator bars having a plurality of longitudinally-spaced openings therein for varying the point of connection with the rock arms.

3. In a potato digger, the combination of a frame having an axle at its rear end, a plow at its front end, a crank shaft mounted on said frame in rear of the plow, rock arms disposed transversely of the frame in spaced relation to the crank shaft, a plurality of separator bars arranged side by side lengthwise of the frame and connected at their front ends to said shaft and at a point forwardly of their rear ends to the respective rock arms, gears fixed on the axle, a counter shaft journaled in the frame forwardly of the axle and carrying pinions meshing with said gears, sprocket wheels loosely mounted on the counter shaft, companion sprocket wheels fixed on the crank shaft, sprocket chains passing around said wheels, the sprocket wheels on said crank shaft being of different diameters, and clutch means for the counter shaft sprocket wheels for controlling the drive of the crank shaft through one or the other of its sprocket wheels.

JOHN REUTHER.